June 19, 1962 A. E. BREWSTER 3,040,304

MAGNETIC INFORMATION STORAGE ARRANGEMENTS

Filed Sept. 28, 1959 3 Sheets-Sheet 1

Inventor
A. E. BREWSTER
By C. H. Suydam
AGENT

MAGNETIC INFORMATION STORAGE ARRANGEMENTS

Filed Sept. 28, 1959 3 Sheets-Sheet 2

Inventor
A.E.BREWSTER
By C.H. Suydam
AGENT

June 19, 1962 A. E. BREWSTER 3,040,304

MAGNETIC INFORMATION STORAGE ARRANGEMENTS

Filed Sept. 28, 1959 3 Sheets-Sheet 3

Inventor
A.E.BREWSTER
By C.H. Suydam
AGENT

United States Patent Office 3,040,304

Patented June 19, 1962

3,040,304
MAGNETIC INFORMATION STORAGE ARRANGEMENTS

Arthur Edward Brewster, London, England, assignor to International Standard Electric Corporation, New York, N.Y.

Filed Sept. 28, 1959, Ser. No. 842,866
Claims priority, application Great Britain Oct. 23, 1958
5 Claims. (Cl. 340—174)

The present invention relates to magnetic information storage arrangements, with particular reference to coders for electric pulse code modulation systems of communication.

The invention consists in an improvement in the invention described and claimed in the specification of copending U.S. application Serial No. 819,089, filed June 9, 1959. This specification will be referred to below as the "parent specification," and describes an example of a pulse coder employing coils having cores of saturable ferromagnetic material, such as ferrite material. In the case of a multi-channel pulse code modulation system, a separate coder is used for each channel.

The parent specification describes a particular case of a 24-channel system in which the 24 channel coders are divided into six similar groups of four channel coders, and each group is controlled by a corresponding one of six pairs of phases of a sampling wave of sinusoidal form. The digit pulses of the four channels in a group have to be transmitted at different times, and as will be explained more fully below, this is achieved by appropriately biasing a group of read-out magnetic cores which control the times at which the digit pulses are sent out. It follows that since the four coders of a group of coders are controlled by the same pairs of phases of the sampling wave, the reading out cores of the four coders have to be differently biased, and this results in the said four coders not being identical, and so they are not interchangeable. It is therefore the principal object of the present invention to improve the biasing arrangements so that all the coders can be made identical. How this is done according to the invention will be understood from the detailed description which follows.

Another object of the invention is to provide code simulators for transmitting predetermined code groups of pulses in any channel position, for the purpose of testing a system which may only be partially equipped with channel coders. Such code simulators also employ the improved biasing arrangements by which the principal object of the invention is achieved.

The invention will be described with reference to the accompanying drawings, in which.

In the case of the coder illustrated in FIGS. 7 and 8 of the parent specification, two sinusoidal sampling waves in quadrature are used to control the coding operation. The first or phase-1 wave triggers or sets a particular one of a group of magnetic cores which corresponds to the magnitude of the sample of the signal wave to be coded. Each level core has one or more digit windings determined by the corresponding code combination, and the level core which is triggered sets a corresponding selection of a group of $n$ output cores, where $n$ is the number of the digits of the code. A group of $n$ reading-out cores is also provided. Phase 2 of the sampling wave is supplied to windings on all the reading-out cores and triggers them all in turn.

Each of the $n$ output cores has an output winding, and all the output windings are connected in series to an output circuit. When a reading-out core is triggered, it triggers the corresponding one of the output cores, if that core has previously been set by a level core, and so the digit pulses are delivered serially to the output circuit.

Figures 1, 2:
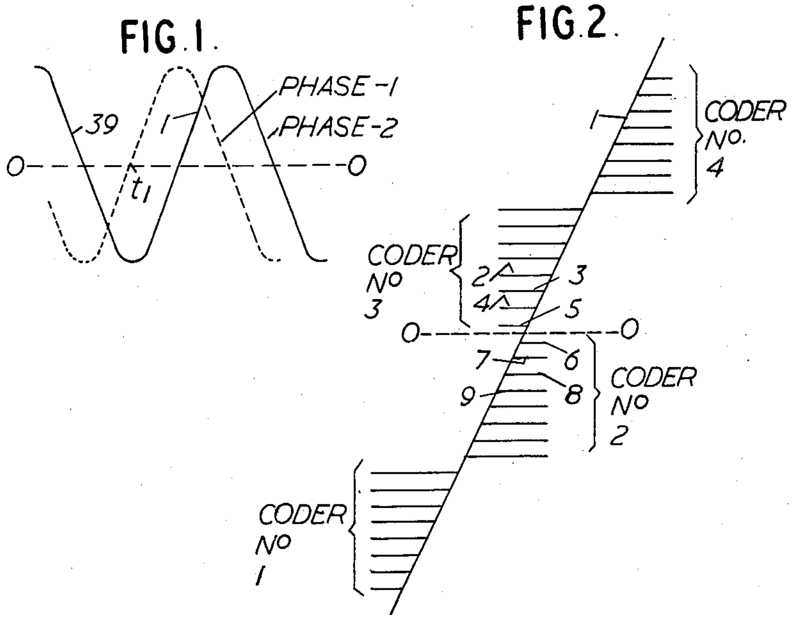
FIGS. 1 and 2 show graphical diagrams used to explain the basis of the invention.

In FIG. 1, the two phases of the sinusoidal triggering wave are shown and are marked phase 1 and phase 2 respectively, with phase 2 lagging phase 1. The level cores are triggered by phase 1 near the time $t_1$ when the wave crosses the zero axis 0—0 in the positive direction. The read-out cores are triggered by phase 2 somewhere along the substantially straight portion or flank 1. In the case where a group of four coders is controlled by the phases 1 and 2, it is necessary to arrange so that the $4n$ reading-out cores ($n$ from each coder) are triggered in turn along this flank. This will be understood more clearly from FIG. 2, which shows the flank 1 of phase 2 to a much larger scale. The dotted line 0—0 in FIG. 2 is the zero axis. It will be assumed for clearness that $n=8$, so that it is necessary to arrange 32 triggering levels (shown as short horizontal lines) along the flank 1, 8 of which correspond to each of the coders 1 to 4 as indicated. The range covered by the 32 triggering levels should preferably correspond to about $\pm30$ electrical degrees of the phase-2 wave. In the case of the coder described in the parent specification, each reading-out core is provided with a bias winding, and all the bias windings are connected in series to a direct current source. In order to provide 32 different triggering levels, all the 32 bias windings have different numbers of turns and/or different winding directions, so that the four coders in the group are all different as regards these bias windings and are accordingly not interchangeable.

The manner in which this objection is overcome according to the present invention will be described with reference to FIG. 3. This shows the eight reading-out cores 2 to 9 which correspond to those shown in FIG. 8 of the parent specification (except that only seven reading-out cores are there shown). The same convention regarding winding directions will be used, as in the parent specification. Thus a line sloping upwards to the left indicates a winding wound "straight" and one sloping upwards to the right indicates a winding wound "reverse." Current flowing downwards through a winding wound "reverse" on a core produces a flux directed from right to left in the drawing, and all cores are initially in the condition such that the flux is directed from left to right.

Each of the cores 2 to 9 has a sampling or triggering winding 10 wound straight. All such windings have the same number of turns, for instance, $p$ turns where $p$ is a positive integer, and are connected in series to a source 11 of the phase-2 wave. Each core also has an output winding 12 wound straight, and each output winding is connected in series with a separate output conductor 13. All the output windings have the same number of turns, for instance, $r$ turns where $r$ is a positive integer. The output conductors 13 are connected to control the output cores (not shown) in the manner explained in the parent specification.

Each of the cores 2 to 9 is provided with a primary bias winding 14, wound reverse on cores 2 to 5 and straight on cores 6 to 9. The primary bias windings 14 have the following numbers of turns:

Cores 5 and 6—$m$
Cores 4 and 7—$3m$
Cores 3 and 8—$5m$
Cores 2 and 9—$7m$ where $m$ is a positive integer.

Each of the cores is also provided with two auxiliary bias windings 15 and 16 wound straight. All the windings 15 have 8*m* turns and all the windings 16 have 16*m* turns.

The windings 14, 15 and 16 of all the cores are connected in respective series bias circuits, the three circuits having terminals designated A—B, C—D, and E—F as shown.

The three bias circuits are connected in series to a direct current bias source 17 by means of two three-position reversing switches 18 and 19 as shown. These switches indicate the nature of the switching operations to be performed, and in practice will preferably be provided in a different form, as will be explained later. An adjustable resistor 20 is connected in series with the source 17 for adjusting the bias current.

The terminals of the sampling winding circuit connected to the source 11 are designated G and H.

The block 21 represent the group of output cores mentioned above, but not otherwise shown in FIG. 3. These output cores supply digit pulses to output terminals J and K in such manner that a positive output pulse makes terminal J positive to terminal K.

It will be seen that when the movable arms of the switches 18 and 19 are in the central position shown, the source 17 supplies a bias current downwards through all the bias windings 14, the bias windings 15 and 16 being out of circuit. Then the bias flux in the cores 6 to 9 aids the flux due to the phase-2 triggering wave, while the bias flux in the cores 2 to 5 opposes that due to the triggering wave. It follows that instead of being triggered at the level of the zero axis 0—0 (FIG. 2) cores 6 to 9 will be triggered at progressively lower levels of the flank 1 of the phase 2 wave, and the cores 5 to 2 at progressively higher levels, owing to the grading of the numbers of turns of the primary bias windings 14. Thus core 9 will be triggered first and core 2 last. The levels at which the cores 2 to 9 are triggered are similarly numbered in FIG. 2. These levels are spaced at distances proportional to 1, 3, 5 and 7 above or below the zero axis 0—0. It follows that output pulses are delivered serially from the windings 12, the earliest pulse being that from core 9 and the latest that from core 2.

Now suppose that the movable arms of the switches 18 and 19 are moved to the left, so that the bias current I flows downwards through all the bias windings. The bias flux produced in all the auxiliary bias windings aids the phase-2 triggering wave, so that the triggering levels of all the cores will be shifted downwards by a distance proportional to $8+16=24$, since windings 15 have 8*m* turns and windings 16 have 16*m* turns. This moves the group of 8 triggering levels downwards to the position designated "Coder No. 1" in FIG. 2. The lowest level, corresponding to the triggering of core No. 9, is at a distance from the zero axis 0—0 proportional to 31. Now suppose the switch 19 be restored to the central position. The auxiliary bias flux produced by the windings 16 is now removed, so that the triggering levels will all be moved upwards by a distance proportional to 16 into the position designated "Coder No. 2." The lowest triggering level is now at a distance proportional to 15 below the zero axis 0—0. It will now be evident that if the switch 18 be now moved to the right-hand position, the 8 triggering levels will be moved to the position designated "Coder No. 3" while if the switches are both in the right-hand position, the 8 triggering levels will be moved to the position designated "Coder No. 4."

In this way the 32 triggering levels for the four coders are spaced equally along the flank 1 of the phase 2 wave, as shown in FIG. 2.

Figure 3:
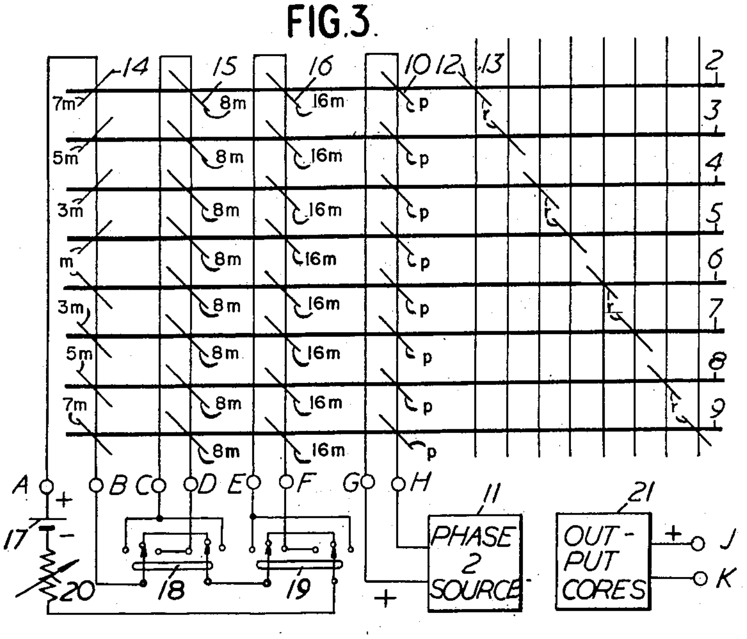
FIG. 3 shows a schematic circuit diagram of part of a coder according to the invention.
Figure 4:
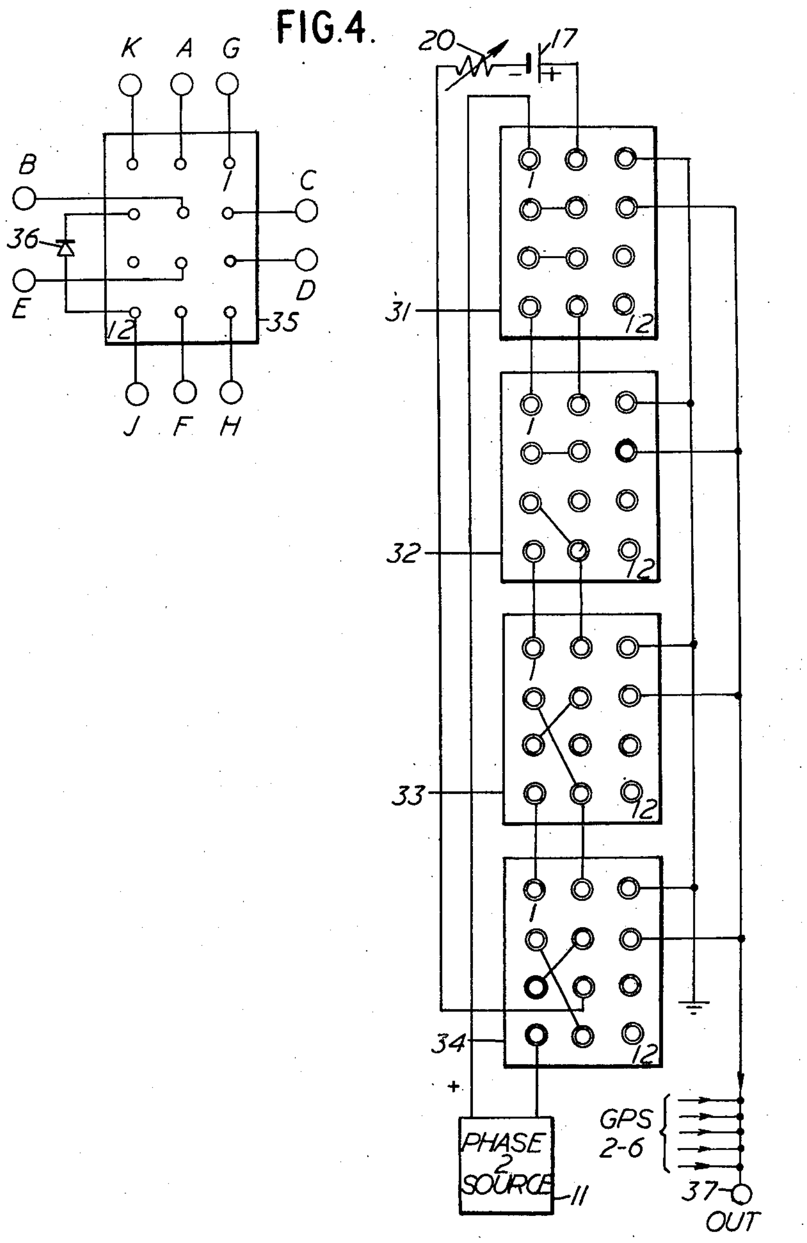
FIG. 4 shows a circuit diagram to illustrate one method of connecting several coders according to FIG. 3.

As already mentioned, the switches 18 and 19 will not generally in practice be provided in the manner shown in FIG. 3. A practical arrangement for the four coders of a group is shown in FIG. 4. It will be understood that the elements 11 and 17 to 20, associated with the individual coders as shown in FIG. 3, will be removed, so that an individual coder terminates on the ten terminals A to K illustrated in association with plug holder 35. Elements 11, 17 and 20 are arranged to be common to the group of coders as shown in FIG. 4. In FIG. 4, four similar socket-holders 31 to 34 corresponding respectively to coders No. 1 to No. 4 (FIG. 2) are provided. Each socket-holder has 12 metal socket connectors. Four corresponding plug-holders are provided respectively for the four coders. Only one of these plug-holders is shown at 35. The sockets in the socket-holders are numbered from left to right and downwards from 1 to 12 as indicated. The plugs of the plug-holder 35 are numbered from right to left and downwards from 1 to 12, and it will be understood that when the plug-holder is turned over to engage one of the socket-holders, each plug engages the correspondingly numbered socket.

The terminals A to K (FIG. 3) of the No. 1 coder are connected to the plugs of the plug-holder 35 according to the following table:

| | |
|---|---|
| A—**2** | F—**11** |
| B—**5** | G—**1** |
| C—**4** | H—**10** |
| D—**7** | J—**12** |
| E—**8** | K—**3** |

and a rectifier 36 is connected between terminals 6 and 12. The other three coders of the group (not shown) are connected to corresponding plug-holders (not shown) in exactly the same way. Each of the four plug-holders will be plugged into the corresponding socket holder.

The connections of the four socket-holders 31 to 34 are as follows. Socket No. 3 in each case is connected to ground and socket No. 6 to an output terminal 37. The terminals of the phase-2 source 11 are connected respectively to socket 1 of holder 31 and to socket 10 of holder 34, and socket 10 of each holder is connected to socket 1 of the next, as shown. This connects all the triggering windings 10 (FIG. 3) of all the coders in series to the source 11.

The positive terminal of the bias source 17 is connected to socket No. 2 of the holder 31, and the negative terminal is connected through the adjustable resistor 20 to socket 8 of holder 34.

Then connections are made between sockets in each holder as follows:

| | |
|---|---|
| Holder **31** | 4—5 and 7—8 |
| Holder **32** | 4—5 and 7—11 |
| Holder **33** | 4—11 and 7—5 |
| Holder **34** | 4—11 and 7—5 |

Then socket 11 of holders 31, 32 and 33 is connected to socket 2 of holders 32, 33 and 34, respectively.

Thus when all the four plug-holders are in position, all the bias windings 14, 15 and 16 (FIG. 3) of all the four coders are connected in series to the source 17. While the group of primary bias windings A—B is connected in the same manner in the four socket-holders, the two groups of auxiliary bias windings are differently connected in each of the four socket-holders, and the four connections correspond respectively to the four settings of the switches 18 and 19 of FIG. 3, described above. Thus the connections of the auxiliary bias windings are determined by the socket-holder into which the coder is plugged.

It will be noted that terminal K of the output cores 21 (FIG. 3) is connected to ground in each socket-holder, and terminal J is connected through the corresponding rectifier 36 to the output terminal 37. This rectifier should be directed so that it passes positive pulses to the output terminal, and is provided to eliminate the unwanted negative pulses which are produced by the settting of the output cores, as explained in the parent specification.

The four coders in each of the other five groups are arranged in exactly the same way, except that they are operated by reading-out waves of respectively different phase, the phases of the six waves differing successively by 60°. The outputs of these five groups are connected to terminal 37 as indicated in FIG. 4.

In the case of a multichannel pulse code modulation system, it may be desired to put only some of the channels in service initially, and in that case these channels may be equipped with coders. Alternatively, during the installation of the system, some of the coders may not be available, and it may be desired to make systems tests before it is fully equipped. In both these cases it is necessary to transmit code combinations of pulses over all the channels whether fully equipped or not. For this purpose a code simulator device of relatively simple construction is needed, which will repeatedly transmit some predetermined code combination of digit pulses, and which can be used instead of a complete coder.

Figure 5:
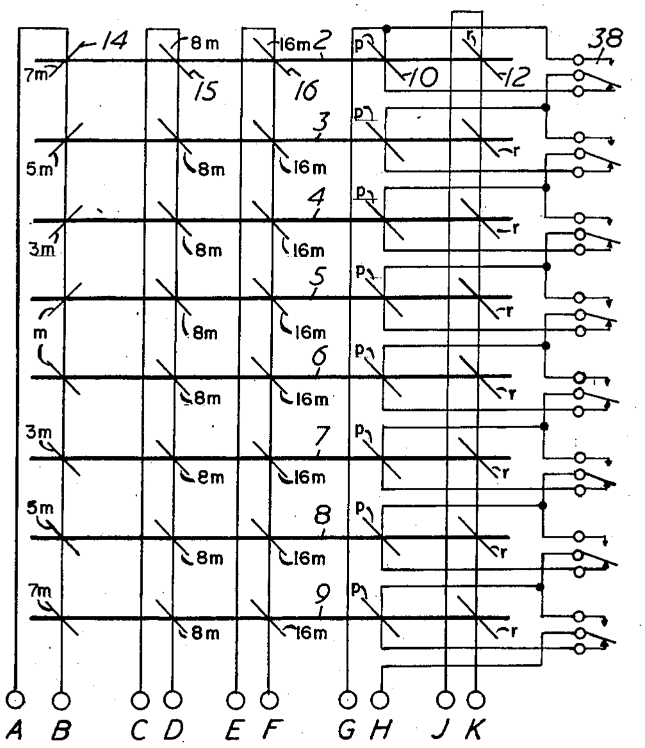
FIG. 5 shows a schematic circuit diagram of a code simulator according to the invention.

Such a code simulator device is shown in FIG. 5 and is substantially the same as the arrangement shown in FIG. 3. It differs from it only in that the output windings 12 are connected directly in series to terminals J and K (the output cores 21 not being needed), and that each triggering winding 10 is provided with a change-over switch 38 by which it can be cut out of the circuit.

The code simulator shown in FIG. 5 is connected to a plug-holder similar to 35 FIG. 4 in the same way as described for the FIG. 3 device, and the plug-holder is plugged into any one of the socket-holders 31 to 34 in order to place the triggering levels in the desired position (FIG. 2).

The reading-out cores shown in FIGS. 3 and 5 are all set by the descending flank 39 of the phase-2 wave (FIG. 1) and are then triggered in turn by the flank 1 as previously described. If all the switches 38 are in the position shown, then a combination of eight digit pulses will be delivered to terminal 37 (FIG. 4). If any switch 38 is operated, then the corresponding triggering winding 10 is cut out, and the corresponding digit pulse is missing, so any code combination of eight digits can be set up by means of the switches 38.

It should be mentioned that the preliminary setting of the cores will produce negative output pulses from the windings 12, but these unwanted pulses are eliminated by the rectifier 36 (FIG. 4).

In many cases it will be required that the code simulator should send out only one predetermined code combination, and in that case all the switches 38 may be omitted, and also those of the cores 2 to 9 from which the predetermined code combination requires no digit pulses. The triggering windings 10 of the remaining cores are all connected in series to the terminals G and H.

It is pointed out that the code simulator shown in FIG. 5 is very much simpler than a complete coder which it temporarily replaces. The coder described in the parent specification (which provides only for a seven digit code) employs a total of 85 magnetic cores, while the code simulator (for 8 digits) employs not more than 8 magnetic cores.

While for the purpose of clearly explaining the invention, a specific example for an eight-digit code, and a group of four coders, has been described, the arrangements may be adapted on the same principles for other codes and groups of coders.

For example, if the auxiliary bias windings 16 (FIGS. 3 and 5) are omitted, the arrangement is suitable for groups of two coders, in which case the corresponding triggering levels will occupy the positions corresponding to Coders 2 and 3 in FIG. 2. If a third auxiliary bias winding (not shown) is provided on each core, with $32m$ turns, then a group of up to eight coders could be accommodated, so long as the eight socket-holders (FIG. 4) are provided with the necessary additional sockets appropriately wired; and the plug-holders likewise with additional plugs. Further additional auxiliary bias windings could be provided on the same plan.

It will be clear also that code combinations of other numbers of digits than eight can be dealt with. For example, in the case of a six digit code, cores 2 and 9 (FIGS. 3 and 5) could be omitted, and the auxiliary bias windings 15 and 16 may in that case have respectively $6m$ and $12m$ turns. The essential point is that the auxiliary bias windings 15 should have more turns than the maximum number of turns of any primary bias winding, and that the auxiliary bias windings 16 should have double the number of turns of the windings 15, and so on in multiples of powers of 2 for any further auxiliary bias windings there may be.

The number of digits of the code does not need to be even. For example, one of the cores 2 or 9 in FIGS. 3 and 5 may be omitted without any other alteration, in which case a seven-digit code is provided for.

It may be mentioned also that in many cases $m$ can be equal to 1, and also that the windings 10 and 12 (FIGS. 3 and 5) can frequently have only one turn. This simplifies the construction of the device.

It should be explained with reference to FIG. 4, that the coders have other terminals not concerned in the switching of the bias windings, which terminals are not shown in the figure. The socket-holders 31 to 34 and the plug-holder 35 may evidently be provided with extra sockets and plugs (not shown) to accommodate these terminals, so that the coders may be plugged in as complete units.

It may be added that various other biasing arrangements producing the results described could clearly be used. For example, the two groups of auxiliary bias windings could be arranged always to be in circuit, and the switching could be arranged to connect the two groups so that they produce aiding or opposing fluxes. In this way the distribution illustrated in FIG. 2 could be obtained. This arrangement may be preferable if it is desired to maintain the resistance of the bias circuit constant under all conditions.

In the case of the code simulator shown in FIG. 5, it is evident that the switches 38 could be connected to the output windings 12 instead of to the triggering windings 10, but this would have the disadvantage that cores would be triggered whether they have to produce output digits or not.

While the principles of the invention have been described above in connection with specific embodiments, and particular modifications thereof, it is to be clearly understood that this description is made only by way of example and not as a limitation on the scope of the invention.

What I claim is:

1. An information storage arrangement comprising: a plurality of cores of saturable ferromagnetic material; means for applying to the cores respectively different initial values of bias flux whereby an applied triggering wave is caused to trigger the cores at respectively different times, said means comprising a primary bias winding an an auxiliary bias winding on each core; means for supplying a bias current to all the bias windings in series; and switching means for changing the direction of the current in the auxiliary bias windings whereby, after the change in the direction of the current, the cores again have respectively different values of bias flux, all such values being different from any of the initial values.

2. An information storage arrangement comprising: a plurality of cores of saturable ferromagnetic material, each of which is provided with a triggering winding and an output winding; means for applying a triggering wave to all the triggering windings in series and means for deriving an output pulse from the output winding of a core in response to the triggering thereof by the triggering wave, each core also being provided with a primary bias winding and an auxiliary bias winding; means for supplying a bias current to all the bias winding in series; and switching means for changing the direction of the bias current in each of the auxiliary bias windings, the numbers of turns of the bias windings and their relative winding directions being so chosen that, according to the direction of the current in the auxiliary bias windings, there are produced one or other of two non-overlapping ranges of triggering levels for the said cores, the triggering levels for each core being different.

3. An information storage arrangement comprising: two groups of cores of saturable ferromagnetic material, each core being provided with a triggering winding connected in series with a triggering circuit; an output winding; a primary bias winding connected in series with a primary bias circuit; an auxiliary bias winding connected in series with an auxiliary bias circuit; the series connections being such that when the two bias circuits are connected in series to a source of bias current the auxiliary bias flux produced in the cores aids the primary bias flux in the cores of one group and opposes it in the cores of the other group; the primary bias windings on the cores of each group having respectively different numbers of turns, while the auxiliary bias windings each have the same number $p$ of turns which is greater than the number of turns of any primary bias winding; means for connecting the triggering circuit to a source of a triggering wave, means for supplying to an output circuit pulses generated in response to the triggering of one or more of the cores; first connecting means adapted to engage the terminals of the bias circuits to connect them in series to a source of bias current in such manner that the bias current flows through the auxiliary bias circuit in one direction; and second connecting means adapted to engage the terminals of the bias circuits to connect them in series to the said source of bias current in such manner that the bias current flows through the auxiliary bias circuit in the oppsite direction.

4. An information storage arrangement according to claim 3 in which each core is provided with an additional auxiliary bias winding having $2p$ turns connected in series with an additional auxiliary bias circuit, the arrangement being such that when the additional auxiliary bias circuit is connected in series with the other two bias circuits to the source of bias current the additional auxiliary bias flux produced in the cores aids the primary bias flux in the cores of one group and opposes it in the cores of the other group, and in which the said first and second connecting means are adapted to engage the terminals of the additional auxiliary bias circuit, comprising third and fourth connecting means adapted to engage the terminals of all bias circuits in such manner that aiding fluxes are produced by the auxiliary bias windings in each core whereby the bias current flows through the two auxiliary bias circuits in one direction when the said third connecting means engages the said terminals, and in the opposite direction when the said fourth connecting means engages the said terminals.

5. An information storage arrangement according to claim 2, in which the said triggering windings are connected in series with a triggering circuit, and in which switching means is provided so arranged as to permit any one or more of the said triggering windings to be cut out of the said triggering circuit.

References Cited in the file of this patent

UNITED STATES PATENTS

| | | |
|---|---|---|
| 2,691,152 | Stuart-Williams | Oct. 5, 1954 |
| 2,696,347 | Lo | Dec. 7, 1954 |
| 2,782,399 | Rajchman | Feb. 19, 1957 |
| 2,846,671 | Yetter | Aug. 5, 1958 |